March 16, 1965 J. HARTMANIS ETAL 3,174,031
SIGNAL WEIGHTING SYSTEM
Filed Oct. 6, 1960
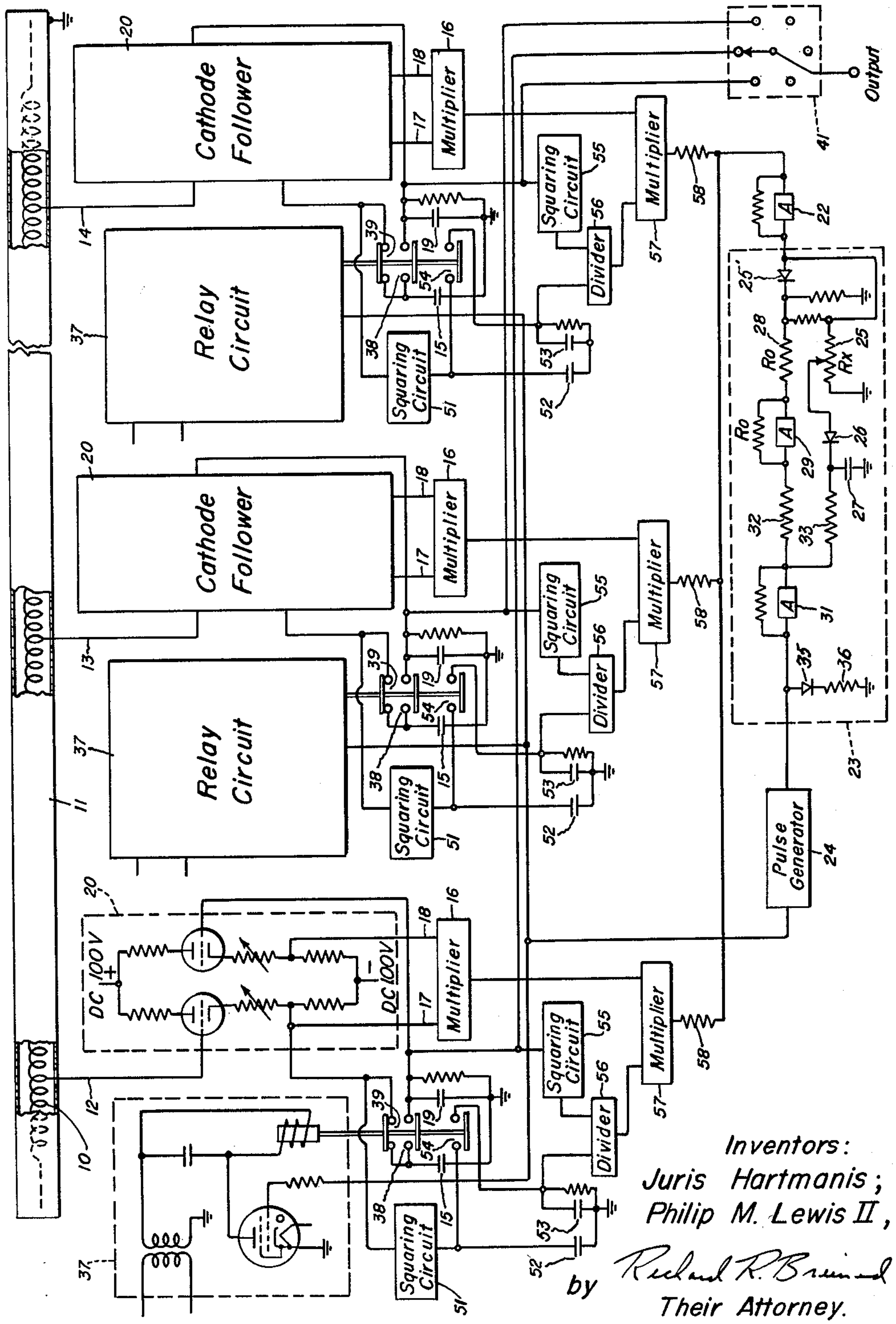
Inventors:
Juris Hartmanis;
Philip M. Lewis II,
by Richard R. Brainard
Their Attorney.

United States Patent Office 3,174,031

Patented Mar. 16, 1965

3,174,031
SIGNAL WEIGHTING SYSTEM

Juris Hartmanis, Scotia, and Philip M. Lewis II, Schenectady, N.Y., assignors to General Electric Company, a corporation of New York Filed Oct. 6, 1960, Ser. No. 60,990
10 Claims. (Cl. 235—181)

The present invention relates broadly to a signal weight system and more particularly to such a system useful in combination with systems for recognizing and storing unknown signals.

In the data handling art there are many applications where the signal to be recognized is not known beforehand and it is desirable in such cases to have the system itself determine from the input received by it the nature of the signal to be recognized and stored. Such systems, which are referred to as adaptive filters or adaptive systems, have been built and are described and claimed, for example, in the application of Charles Jakowatz entitled "A Self-Adapting Filter," Serial No. 7,276, filed February 8, 1960. Adaptive systems have been successfully used for recognizing waveforms which are contained in an input to the system where the characteristics of the waveforms are not known beforehand. Such a system will recognize and store a signal buried in the noise contained in the input. The recognition of certain signals by these systems may, however, be quite difficult if portions of the waveforms of the signals vary among the class of signals to be recognized. For example, it may be desirable to recognize a square pulse signal which is contained in an input to the system. The pulse width of this square pulse may vary considerably over the class of square pulses which the system is to recognize. The recognition of such a class of signals is quite difficult unless the variation, or spread, between the signals can be partially ignored by the system. Under these circumstances the signals having the greatest variations are the least important to a final recognition of the class of signals. In order to recognize these signals the system of this invention performs the function of weighting the incoming signals in accordance with their importance.

Accordingly, it is an object of the present invention to provide an improved system in which the significance of different incoming signals is weighted in accordance with variations in the different signals over a period of time.

It is a further object of the present invention to provide an improved adaptive system which, in making a determination of whether the recognized signals are to be inserted into storage, will weight the signals contained in the input according to their importance.

It is a further object of the present invention to provide an improved adaptive filter which will compute the spread of the characteristics of each signal over the class of signals to be recognized and will insert the signals into storage in accordance with this spread.

In accordance with the illustrated embodiment of the invention, our adaptive filter is shown in conjunction with the adaptive filter described and illustrated in the aforementioned Jakowatz application. However, it should be understood that, with minor changes, our invention could be used with other systems which recognize and store unknown signals.

In systems of the type described in the Jakowatz application, an electrical input including an unknown signal plus noise is impressed on a delay line which has a plurality of taps. A plurality of sampling capacitors are provided for sampling the voltages at each of the taps and a plurality of storage capacitors are provided for storing voltages which are indicative of the recognized signals. Circuitry is provided for determining the similarity or correlation between the stored voltages and the voltages on the sampling capacitors. Relay circuits which connect the sampling capacitors to the storage capacitors are arranged to be actuated in response to a maximum value of this correlation.

In accordance with one form of our invention, additional circuitry is incorporated in an adaptive system of the above-described type. This circuitry determines at each tap the variance of the recognized signals over the class of recognized signals. In order to obtain this variance, we provide, at each tap, means for determining the average of the squares of the detected signals and means for determining the square of the average of the detected signals. The mathematical variance is defined as the first of these quantities minus the second. A quantity indicative of the variance is obtained by dividing the square of the average of the signals by the average of the squares of these signals. This quantity has a value of unity when the difference is zero and a minimum value when the difference is a maximum. Circuitry is further provided for multiplying the correlation function by a value indicative of the variance. We thus form a weighted correlation function which is used to determine the times at which the sampling capacitors are to be connected to the storage capacitors.

A better understanding of our invention together with further objects and advantages thereof will be better understood from a consideration of the following description taken in connection with a drawing, the single figure of which shows one form of our improved adaptive filter.

Referring to the circuit of the drawing, the input, including the signal to be recognized and noise, is fed into a delay line which includes an elongated inductive element 10 surrounded by a grounded cylindrical conductor 11 and provided with a number of taps 12, 13 and 14, equally spaced and equal in number to the number of sampling points desired. The voltages at each of these taps are continuously sampled by sampling capacitors 15 and also are continuously applied to the input of multipliers 16 by input conductors 17. A second input to the multipliers is supplied by conductors 18 from storage capacitors 19. These inputs are impressed on conductors 17 and 18 through a pair of cathode follower circuits designated generally by the numeral 20.

The storage capacitors 19 are connected so that each may be selectively placed in parallel with a corresponding one of the sampling capacitors 15 to effect a weighted averaging of the voltages on the two capacitors. In order to transfer the voltages on the sampling capacitors 15 to the storage capacitors 19 in response to the detection of a peak in the weighted correlation function, relay circuits 37 are provided to actuate relays having a normally open set of contacts 38 and a normally closed set of contacts 39.

In order to detect peaks in the weighted correlation function, a threshold detector 23 is provided. The output of the D.C. amplifier 22, designated $e_{in}$, is supplied to the threshold detector 23 to provide a keying voltage pulse for a pulse generator 24 whenever the output of the amplifier 22 reaches a peak greater than the previous peak output of this amplifier. The threshold detector 23, together with the pulse generator 24, produce an output pulse each time the correlation function $e_{in}$ reaches a peak greater than the previous peak of $e_{in}$. The threshold detector 23 compares the input to the detector with a value, designated as $e_{in/max.}$, indicative of the maximum value that the input has previously attained. The output of the amplifier 22 is fed to the threshold detector 23 through variable resistor 25 and diode 25'. The tap on variable resistor 25 is connected to a diode 26 and the cathode of diode 26 is connected to the capacitor 27 which stores peak values of the voltage $e_{in}$. The voltage on the capacitor 27 is designated as $e_1$.

The voltage $e_{in}$, taken from the cathode of the diode 25', is connected through a resistor 28 to an inverting amplifier 29. The inverted value of $e_{in}$ is added to the voltage $e_1$ from the storage capacitor 27. These two voltages are connected through resistors 32 and 33, respectively, to a common junction at which point the addition takes place. The result of this addition is again inverted by an inverting amplifier 31; the output of this amplifier being designated $e_{out}$. A clipping diode 35 shunts all positive values of $e_{out}$ to ground through a resistor 36.

Briefly, the operation of the threshold detector 23 is as follows. The voltage $e_1$ on the storage capacitor 27 is always indicative of the previous peak value of the input $e_{in}$ because the diode 26 prevents discharge of the capacitor 27. The voltage $e_1$ may correspond to the previous maximum of voltage $e_{in}$ or a predetermined fraction thereof, depending upon the setting of the tap on resistor 25. Each time that the input voltage $e_{in}$ exceeds the voltage $e_1$ stored on the storage capacitor 27, the inverting amplifier 31 will produce an ouput which is connected to actuate pulse generator 24. Pulses from the pulse generator 24 energize the relay circuits 37 in response to the detection of a peak in the weighted correlation function.

In order to provide an output from the adaptive system, an output commutator 41 is provided. Each of the contacts on the commutator 41 is connected to a different one of the storage capacitors 19. As the commutator rotates the voltage on each of the storage capacitors is successively connected to the output. This output provides a progressively better indication of the signal connected to the input of the adaptive system as the operation of the adaptive system proceeds.

So much of the adaptive filter as has been described so far, with the exception of the weighted correlation function, is described and claimed in the Jakowatz application. When it is desired to employ adaptive filters of this type in recognizing signals which vary over the class of signals to be recognized we provide a system which computes the spread of the characteristics of each signal, or the variance, with respect to the class of signals previously recognized and insert the signals into storage in accordance with the variance.

In order to determine the variance of each recognized signal from the mean of the signals previously recognized and stored, we provide circuitry which will determine the average of the squares of the recognized signals and which will determine the square of the average of the recognized signals. For convenience the circuitry will be described as associated with one of the delay line taps. It will be understood that the same circuitry is provided for each of the taps. To form the square of the recognized signals, we connect a squaring circuit 51 to tap 12 of the delay line through one of the cathode follower circuits 20. The output of the squaring circuit 51 is continuously sampled by secondary sampling capacitor 52. In order to form the average of the squares of the detected signals, we provide a secondary storage capacitor 53. The secondary sampling capacitor 52 is momentarily connected to the secondary storage capacitor 53 through a set of normally open contacts 54 when the relay circuit 37 is actuated in response to the detection of a peak in the weighted correlation function. Each time the normally open set of contacts 54 is closed the secondary sampling capacitor 52 is connected in parallel with the secondary storage capacitor 53 to bring these capacitors to voltage equilibrium. This operation effects a weighted averaging of the voltages on the capacitors, the weighting depending upon the ratio of the capacities of the two capacitors. Thus, after a suitable number of switching operations the voltage on the capacitor 53 will be the average of the squares of the recognized input voltages appearing at the corresponding tap of the delay line.

In order to obtain the square of the average of the signals, we connect a squaring circuit 55 to the storage capacitor 19. The voltage on the storage capacitor 19 is indicative of the average of all previously recognized signals. The output of the squaring circuit 55 is the square of the average of previously recognized signals. The squaring circuit may be simply a multiplying circuit with the same input applied to each of two input connections.

In order to obtain a weighting factor, designated $K_1$, to be used in obtaining the weighted correlation function, we provide a divider 56. The average of the squares of the recognized signals from the storage capacitors 53 and the square of the average of the recognized signals from the squaring circuit 55 are both connected to the divider 56. The output of the divider 56 is the square of the average divided by the average of the squares, this output being designated as $K_1$. $K_1$ is indicative of the variance of each recognized signal from the mean of the previously recognized signals. Suitable divider circuits are well known and divider circuit 56 may, for example, be of the type available from George A. Philbrick Researches, Inc., 285 Columbus Avenue, Boston 16, Massachusetts, designated Gap/R Model MU/DV.

In order to weight the correlation function in accordance with $K_1$, we connect the divider 56 to a multiplier 57. Also connected to the multiplier 57 is the output of the multiplier 16. The output of each of the multipliers 57 is connected through a resistor 58 to a common junction. Thus the outputs of all of the multipliers 57 are added together to form a weighted correlation function which is connected to the amplifier 22.

A random sample is initially inserted into storage in each of the storage capacitors 19. This may be accomplished by producing a voltage pulse from pulse generator 24, either by manual means or by providing essentially a zero initial threshold of operation for threshold detector 23. After the first switching operation the voltage of both the capacitor 53 and squaring circuit 55 will be the square of the first sample and the output of the divider 56 which is designated $K_1$ is unity. The input voltage at each of the taps 12, 13, 14 is multiplied, in each of the multipliers 16, by the contents of storage from the corresponding storage capacitor 19. The output of each multiplier 16 is initially multiplied by unity in each of the multipliers 57. The outputs of the multipliers 57 are added together, thus forming the weighted correlation function, and fed to the threshold detector 23 through amplifier 22. When the weighted correlation function exceeds a value indicative of a predetermined fraction of the previous maximum of the weighted correlation function, the relay circuits 37 are actuated, thus closing momentarily the contacts 38 and 54. The closing of the contacts 38 results in the sampling capacitor 15 and the storage capacitor 19 being connected in parallel thereby effecting an averaging of the voltages on the two capacitors.

Upon the closing of the contacts 54 the square of the recognized signal is also placed into storage in the secondary storage capacitors 53. The square of the average of the signals from the squaring circuit 55 is divided by the average of the squares of the signals in the dividers 56. A value of $K_1$ is now obtained from the output of each of the dividers 56 which is less than unity by an amount dependent upon the variation or difference between the voltages stored in capacitors 52 and 19. The values of $K_1$ are recalculated each time the relays operate to add a new sample to storage so that the outputs of each of the multipliers are weighted in accordance with the value of $K_1$ provided by the output of the associated divider 56.

As previously pointed out the weighting in the specific embodiment is in accordance with the ratio of the square of the average to the average of the squares of the signals added to storage. Other functions of these two quantities may be employed and generically speaking these functions should have a maximum value when the variance (i.e. the difference between the two functions) is zero or a minimum and a minimum value when the variance is a maximum. It is seen that the specific embodiment provides a value of $K_1$ equal to unity when the variance is zero that is when the two quantities are equal and decreases steadily as the difference increases.

While certain specific embodiments of our invention have been shown and described, it will, of course, be understood that various other modifications may be made without departing from the principles of the invention.

What we claim as new and desire to secure by Letters Patent of the United States is:

1. An adaptive filter for recognizing a class of signals contained in an input comprising sampling means for sampling voltages indicative of said input, storage means for storing voltages indicative of said signals, first multiplying means for producing an output indicative of the correlation between the voltages in said storage means and the voltages in said sampling means, means producing a weighting factor indicative of the variance of each recognized signal with respect to the class of signals previously recognized, a second multiplying means for multiplying the output of said first multiplying means by said weighting factor, a threshold detector, the output of said second multiplying means being connected to energize said threshold detector, said threshold detector producing an output only when the output of said second multiplying means exceeds a predetermined fraction of the previous maximum output of said second multiplying means, and means for connecting said sampling means to said storage means in response to an output of said threshold detector.

2. An adaptive filter for recognizing a class of signals contained in an input comprising a delay line having a plurality of taps, said input being applied to said delay line so that said input appears at the taps of said delay line delayed by an increasing increment of time at each tap, sampling means connected to each of said taps for sampling voltages indicative of said input, storage means for storing voltages indicative of said signals, correlation means for producing an output indicative of the correlation between the voltages in said storage means and the voltages in said sampling means, means for determining the variance of each recognized signal with respect to the class of signals previously recognized, means for multiplying the output of said correlation means by the output of said variance determining means, a threshold detector, said multiplying means being connected to said threshold detector, said threshold detector producing an output only when the output of said multiplying means exceeds a predetermined fraction of the previous maximum output of said multiplying means, and means for connecting said sampling means to said storage means in response to an output of said threshold detector.

3. An adaptive filter for recognizing a class of signals contained in an input comprising a plurality of sampling means for sampling voltages indicative of said input, a plurality of storage means for storing voltages indicative of said signals, a plurality of first multipliers, each of said sampling means and each of said storage means being connected to a corresponding one of said multipliers, the output of each of said first multipliers being the voltage in said storage means times the voltage in the corresponding sampling means, a plurality of means for determining the variance of each recognized signal with respect to the class of signals previously recognized, a plurality of second multipliers, the output of each of said first multipliers and the output of each of said variance determining means being connected to a corresponding one of said second multipliers, the output of each of said second multipliers being the output of a first multiplier times the output of the corresponding one of the variance determining means, a threshold detector, the outputs of said second multipliers being connected to the input to said threshold detector, said threshold detector producing an output only when the input to said threshold detector exceeds a predetermined fraction of the previous maximum input of said threshold detector, means for connecting each of said sampling means to its corresponding storage means, the output of said threshold detector being connected to said last-named means so that said last-named means is actuated only when said threshold detector produces an output.

4. An adaptive filter for recognizing a class of signals contained in an input comprising sampling means for sampling voltages indicative of said input, storage means for storing voltages indicative of said signals, correlation means for producing an output indicative of the correlation between the voltages in said storage means and the voltages in said sampling means, means for producing an output indicative of the average of the squares of the input signals, said sampling means being connected to provide an input for said last-named means, means for producing an output indicative of the square of the voltage in said storage means, said storage means being connected to provide an input for said last-named means, a divider, the said average of the squares and the said square of the average being connected to said divider such that the latter is divided by the former, means for multiplying the output of said correlation means by the output of said divider, a threshold detector, the output of said multiplying means being connected to said threshold detector, said threshold detector producing an output only when the output of said multiplying means exceeds a predetermined fraction of the previous maximum output of said multiplying means, and means for connecting said sampling means to said storage means in response to an output of said threshold detector.

5. An adaptive filter for recognizing a class of signals contained in an input comprising a plurality of sampling capacitors for sampling voltages indicative of said input, a plurality of storage capacitors for storing voltages indicative of said signals, a plurality of first multipliers, each of said sampling capacitors and each of said storage capacitors being connected to a corresponding one of said first multipliers, the output of each of said first multipliers being the product of the voltage on a storage capacitor times the voltage on the corresponding sampling capacitor, means for connecting each of said sampling capacitors to a corresponding one of said storage capacitors, a plurality of means for producing an output indicative of the average of the squares of the input signals, each of said sampling capacitors being connected to provide the input to a corresponding one of said last-named means, a plurality of means for producing an output indicative of the square of the voltage in said storage capacitors, each of said storage capacitors being connected to provide the input to a corresponding one of said last-named means, a plurality of dividers, each of said means for determining the average of the squares and each of said means for determining the square of the average being connected to a corresponding one of said dividers, the output of each of said dividers being indicative of the square of the average of said recognized signals divided by the average of the squares of said recognized signals, a plurality of second multipliers, the output of each of said first multipliers and the output of each of said dividers being connected to a corresponding one of said second multipliers, the output of each of said second multipliers being the output of said first multiplier multiplied by the output of a corresponding one of said dividers, a threshold detector, the outputs of said second multipliers being connected to the input to said threshold detector, the input to said threshold detector being the sum of the outputs of said second multipliers, said threshold detector producing an output only when the input to said threshold detector exceeds a predetermined fraction of the previous maximum input to said threshold detector, the output of said threshold detector being connected to said means for connecting said first sampling capacitor to said first storage capacitor so that said connection means are actuated only when said threshold detector produces an output.

6. An adaptive filter for recognizing a class of signals contained in an input comprising first sampling means for sampling voltages indicative of said input, first storage means for storing voltages indicative of said signals, correlation means for producing an output indicative of the correlation between the voltages in said storage means and the voltages in said sampling means, first squaring means, said input being connected to said first squaring means, second sampling means connected to the output of said first squaring means, second storage means, said second storage means storing a voltage indicative of the average of the squares of said recognized signals, second squaring means, said first storage means being connected to said second squaring means, the output of said second squaring means being indicative of the square of the average of said recognized signals, divider means, said second storage means and said second squaring means being connected to said divider means, the output of said divider means being indicative of the square of the average of said recognized signals divided by the average of the squares of said recognized signals, means for multiplying the output of said correlation means by the output of said divider means, a threshold detector, said multiplying means being connected to said threshold detector, said threshold detector producing an output only when the output of said multiplying means exceeds a predetermined fraction of the previous maximum output of said multiplying means, means for connecting said first sampling means to said first storage means and for connecting said second sampling means to said second storage means, the output of said threshold detector being connected to said last-named means, said last-named means being actuated only when said threshold detector produces an output.

7. In an adaptive filter for recognizing a signal contained in an input of the type comprising a plurality of first sampling capacitors for sampling voltages indicative of said input, a plurality of first multipliers, each of said first sampling capacitors and each of said first storage capacitors being connected to a corresponding one of said first multipliers, and means for connecting each of said first sampling capacitors to a corresponding one of said first storage capacitors, the improvement comprising a first squaring circuit, said input being connected to said first squaring circuit, a plurality of second sampling capacitors, the output of each of said first squaring circuits being connected to a corresponding one of said second sampling capacitors, a plurality of second storage capacitors, means for connecting each of said second sampling capacitors to a corresponding one of said plurality of second storage capacitors, each of said plurality of second storage capacitors being charged to a voltage indicative of the average of the squares of said recognized signals, a plurality of second squaring circuits, each of said first storage capacitors being connected to a corresponding one of said plurality of said second squaring circuits, the output of each of said second squaring circuits being indicative of the square of the average of said recognized signals, a plurality of divider circuits, each of said second storage capacitors and each of said plurality of second squaring circuits being connected to a corresponding one of said divider circuits, the output of each of said divider circuits being indicative of the square of the average of said recognized signals divided by the average of the squares of said recognized signals, a plurality of second multipliers, the output of each of said first multipliers and the output of each of said divider circuits being connected to a corresponding one of said second multipliers, a threshold detector, the outputs of said second multipliers being connected to the input of said threshold detector, the input to said threshold detector being the sum of the outputs of said second multipliers, said threshold detector producing an output only when the input to said threshold detector exceeds a predetermined fraction of the previous maximum input to said threshold detector, the output of said threshold detector being connected to said means for connecting said first sampling capacitors to said first storage capacitors and the output of said threshold detector being connected to the means for connecting said second sampling capacitors to said second storage capacitors so that both of said last-named connection means are actuated only when said threshold detector produces an output.

8. A recognition system comprising means for producing a plurality of voltages including voltages indicative of the information to be recognized, a plurality of sampling means each sampling one of said voltages, a plurality of corresponding storage means, means for determining the overall correlation between voltages on said sampling means and storage means, means for adding the voltage of the respective sampling means to its corresponding storage means in response to an accepted degree of correlation between the voltages on said storage means and the voltages on said sampling means, and means for weighting the significance of the voltages at each of the different storage means in determining the correlation in said correlation means in accordance with the variance between information recognized by achieving an accepted degree of correlation, and past recognized information.

9. Apparatus for deriving a signal from an input comprising input coupling means; storage means for retaining indications representative of a particular signal; threshold means for detecting a degree of correlation between said indications in storage and subsequently recognized signals as said correlation exceeds a predetermined threshold; means responsive to the detection of said degree of correlation for combining, with storage, proportional values corresponding to said recognized signals which thus correlated with said storage to thereby improve the quality of said stored indications; and means for altering said correlation in accordance with the variance between a sequence of said recognized signals thus combined with storage.

10. Apparatus for deriving a signal from an input comprising; input coupling means; storage means for retaining indications representative of a particular signal; threshold means for detecting a degree of correlation between said indications in storage and subsequently recognized signals as said correlation exceeds a predetermined threshold; means responsive to the detection of said degree of correlation for combining, with storage, proportional values corresponding to said recognized signals which thus correlated with said storage to thereby improve the quality of said stored indications; means for raising said threshold in proportion to the amount by which it has been exceeded; means for multiplying correlation values with the variance values between a sequence of recognized signals wherein variance is taken as the square of the average of the recognized signals divided by the average of the squares of the recognized signals; circuitry providing said square of the average comprising means for squaring the electrical content of said storage means; circuitry providing the said average of squares comprising means for squaring the said recognized signals and a storage element for averaging the output of said last mentioned means; means for dividing said square of the average by the average of the squares to produce the resulting variance; and means for applying the same to said means for multiplying the correlation.

References Cited by the Examiner

UNITED STATES PATENTS

| | | | |
|---|---|---|---|
| 2,897,476 | 7/59 | Widess | 235—181 |
| 3,022,005 | 2/62 | Dickinson | 235—154 |

MALCOLM A. MORRISON, *Primary Examiner.*

IRVING L. SRAGOW, *Examiner.*